United States Patent [19]
Andrews

[11] 4,330,350
[45] May 18, 1982

[54] PREENCODABLE ID CARDS

[75] Inventor: Paul A. Andrews, Belmont, Mass.

[73] Assignee: Polaroid Corporation, Cambridge, Mass.

[21] Appl. No.: 240,083

[22] Filed: Mar. 3, 1981

[51] Int. Cl.³ .................. B32B 31/00; G09F 3/02; B44C 1/26; B32B 3/10
[52] U.S. Cl. .................................. 156/152; 40/1; 40/1.5; 40/2.2; 156/293; 428/13; 428/67; 428/140; 283/7
[58] Field of Search ............... 156/152, 293; 428/13, 428/67, 140; 40/2.2, 1.5, 1; 283/7

[56] References Cited

U.S. PATENT DOCUMENTS

| 3,836,414 | 9/1974 | Staats | 156/152 |
| 3,949,501 | 4/1976 | Andrews et al. | 40/2.2 |
| 4,100,011 | 7/1978 | Foote | 40/2.2 |
| 4,101,701 | 7/1978 | Gordon | 40/2.2 |
| 4,180,207 | 12/1979 | Lee | 40/2.2 |
| 4,183,554 | 1/1980 | Howard, Jr. | 40/2.2 |

Primary Examiner—William R. Dixon, Jr.
Attorney, Agent, or Firm—Louis G. Xiarhos

[57] ABSTRACT

Identification (ID) cards including a removable interleaf support to accommodate preencoding of an attached magnetic stripe element.

11 Claims, 4 Drawing Figures

PREENCODABLE ID CARDS

Laminated documents, such as identification (ID) cards, including an information-bearing document covered with a transparent protective sheet material or sealed between the sheets of a protective pouch, are well known in the art. A favored structure for fully protecting the front and rear of the encased document is to seal it in an envelope-type pouch. This typically would be accomplished by providing a pouch having front and rear protective sheet members sealed along a portion of their peripheral edge and having an open position adapted to receive the information-bearing document. Following insertion of the ID document, the remaining open side or sides are then sealed, preferably by heat sealing techniques. A particularly favored structure includes a frame member set between the protective sheets and outlining a well section of dimensions suitable to accept and contain the inserted ID document.

To supplement the identifying or personalized information of the information-bearing document sealed within an card structure, it also is often a desirable feature to provide a magnetically encodable means incorporated with the ID card having the capability of imparting to the ID card descriptive or identifying indicia pertaining to the authorized bearer. The magnetically encodable means may be suitably encoded using devices well known in the art and then be used in conjunction with well known detection apparatus both to validate the card and to record transactions, e.g., purchases, banking transfers, and the like, performed by the bearer. The magnetically encodable device commonly takes the form of a stripe extending over a predetermined area of the outermost surface of one of the protective sheet members.

It is preferred to have the capability of issuing "instant" or "on-the-spot" ID cards to circumvent possible security, handling and/or distribution problems and to provide the feature of convenient, immediate usability to the intended bearer. Unfortunately, features added to augment the security of ID cards often introduce additional procedures which complicate an "instant issuance" program. The inclusion of a magnetic stripe, for example, presents an impediment to an "instant issuance" scheme.

The information-bearing document of an ID card commonly is a photographic print. To accommodate an "instant issuance" system, quick, self-developing diffusion transfer photographic techniques can be employed to produce the required document. A favored ID card structure, as described above, has a frame member set between two protective sheets; a magnetic stripe extends across the outermost surface of one of the protective sheets. Using such an ID card structure, a typical system involves preparing a photographic information-bearing document, cutting the document and positioning it within the well opening of the ID card, and then sealing the structure with a laminator. Once the document is encased in the ID card structure, it serves to fill the void of the well opening and provide a continuous, flat support surface beneath the magnetic stripe element which is carried on the exterior protective sheet. Such underlying support is needed to avoid distortion of the magnetic stripe while it is being selectively magnetized by the recording head of an encoding device. During encoding, as the recording head traverses the magnetic stripe, it must maintain a rigid degree of contact with the stripe element. Slight distortion of the stripe into the well opening from the pressure of the recording head would result in encoding errors.

"Instant issuance" ID card systems are commercially available, for example, from Polaroid Corporation. These commercial systems, which generally include a camera, a die cutter and a laminator, are compact and portable and are designed to offer mobility for circulation by a card-issuing operation for utility at various locations accessible to the intended card bearing individuals. Generally, however, magnetic recording devices are permanently installed at a central location. Accordingly, if an ID card includes a magnetically encodable feature, the photographic document-containing ID card may be prepared and sealed at a convenient, remote site, but, then must be forwarded to the central magnetic encoder location. "Instant issuance" cannot be accommodated unless, at the sacrifice of the convenience of mobility, the bearer, the basic ID system equipment and the magnetic encoder are all required to be present at the same site.

Now, according to the present invention, an ID card structure is provided which includes a magnetically encodable element that can be preencoded to facilitate "instant issuance."

In accordance with the practice of the present invention, a novel protective envelope structure is employed in conjunction with a magnetic encoding capability. The envelope structure comprises front and rear protective sheet members sandwiching a frame member having a well opening of dimensions suitable to accommodate an information-bearing document; a removable interleaf support is positioned within the well opening. The front protective sheet should be transparent to afford ready viewability of the encased document; the rear protective sheet may be either transparent or opaque. One of the protective sheets may be prebonded to the frame member, while the other protective sheet should be at least partially removable, so as to provide access to the well opening for extraction of the removable interleaf and introduction of the information-bearing document. Preferably, the magnetic encoding element is applied in the form of a stripe over a predetermined area of the outermost surface of one of the protective sheets.

The removable interleaf support member should have dimensions that are substantially the same (slightly smaller) as the dimensions of the well opening of the frame member. Presence of the removable interleaf in the well opening provides a substantially flat surface which offers underlying support behind the protective sheet members set in superposition thereto. Accordingly, substantially all portions of the magnetic stripe element extending across one of the protective sheets are supported in such a manner that a recording device may encode the stripe element without distorting the stripe in the area of the well opening. This preencoding capability permits the utility of the predescribed, advantageous "instant issuance" system. Using the structure of the present inventions, blank ID card protective envelope structures may be preencoded at a central encoding facility prior to being distributed to remote locations convenient to the intended bearer, where the photographic information will be recorded. In combination with a diffusion transfer photographic system, "instant issuance" readily may be accomplished. If the magnetically encoded information is specific to a particular bearer rather than general in nature, the removable interleaf conveniently may be marked so as to carry identifying indicia to ensure that the proper ID document is mated with its corresponding preencoded pouch.

The invention will be better understood by reference to the accompanying drawings in which.

Figure 1:
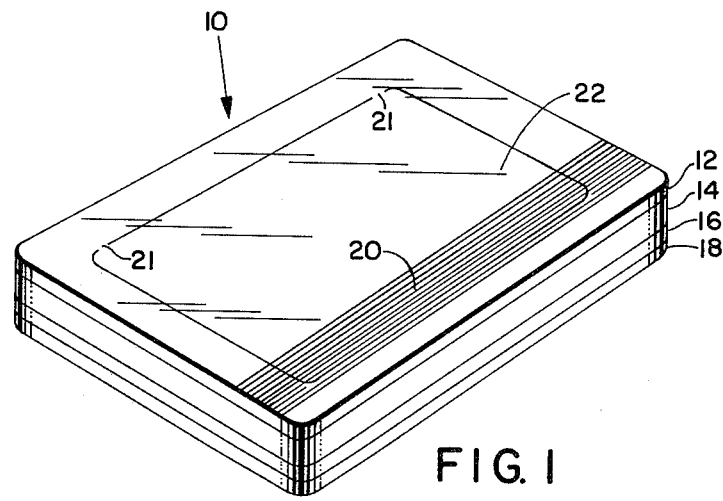
FIGS. 1 and 2 are perspective views of an ID card envelope structure according to the present invention.

A preferred embodiment of the present invention is illustrated in FIG. 1. Envelope-type protective pouch structure 10 typically comprises a colorless, transparent plastic front cover sheet 12, a colorless, transparent plastic back sheet 18, an opaque plastic support sheet 16, and an opaque plastic frame member 14. A magnetically encodable stripe element 20 extends across the width of front sheet 12. Through the transparent cover sheet 12 can be seen removable interleaf member 22 which occupies the well section outlined by frame member 14 and is attached to the frame member edge tabs 21. Positioned in this manner, interleaf 22 in combination with frame 14 provide a substantially flat, continuous support surface behind cover sheet 12. The envelope structure is shown in a closed, though unsealed, position. In this mode, magnetic stripe 20 is set to be encoded by a suitable recording device. The presence of interleaf support 22 in the well opening prevents the distortion of cover sheet 12 and stripe 20 that would otherwise occur as the recording head applied pressure across the stripe in areas backed by the well opening.

Figure 2:
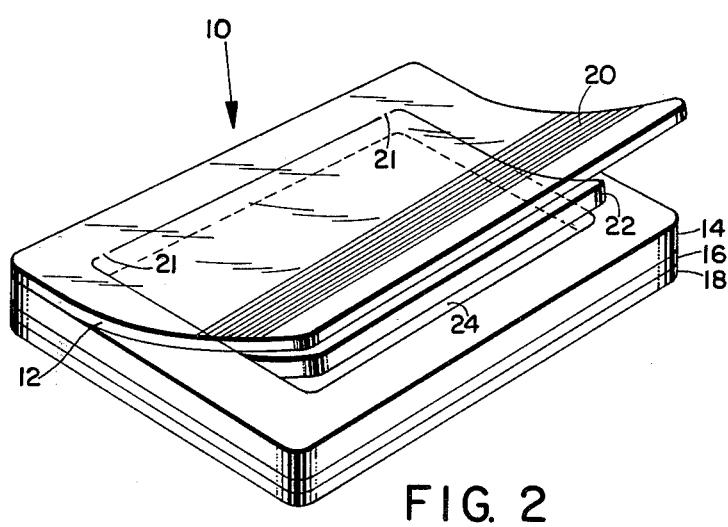

The ID card structure, bearing preencoded magnetic stripe 20, then is available for utility in a standard "instant issuance" ID card system. Cover sheet 12 is attached to frame member 14 by a series of welds (not shown) along one of their common peripheral edges, in order to maintain component alignment and integrity prior to final sealing of the structure. As illustrated in FIG. 2, cover sheet 12 comprises a flexible plastic material which can be lifted and bent back to provide access to the interior structure of the card. Removable member 22 can readily be withdrawn by lifting an edge and tearing it out along edge tabs 21, thereby exposing well opening 24.

Figure 3:
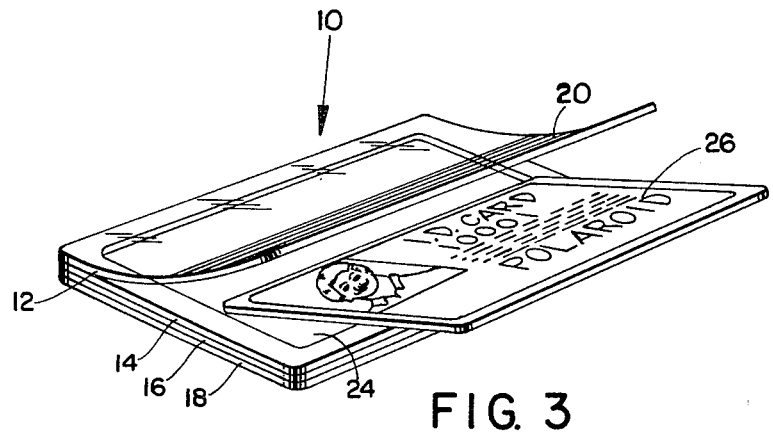
FIG. 3 is a perspective view depicting a photographic information-bearing document being inserted into an ID card envelope structure.

Once the interleaf member 22 is removed from its position within the well area of frame 14, the ID structure is set to receive an information-bearing document, commonly a photographic print. FIG. 3 depicts an information-bearing document 26, including an image 28 of the intended bearer, being inserted into well opening 24 of structure 10.

Figure 4:
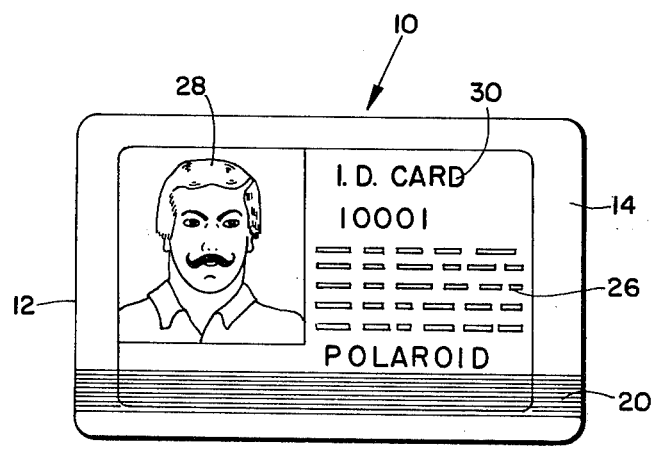
FIG. 4 is a frontal view of a sealed ID card.

FIG. 4 is a front view of a typical ID card. After document 26 is positioned within frame 14, front cover sheet 12 is superposed over the document and sealed in place. Document 26, including bearer image 28 as well as other pertinent data 30, can be viewed through the transparent cover sheet. Magnetic stripe 20 extends across the card in a noninformation bearing area.

The components of the ID card structure may comprise any of the variety of suitable materials as are widely known and employed in the art. In a favored structure, front and back protective sheets 12 and 18, support sheet 16 and frame member 14 all comprise plastic materials, e.g., polyesters such as polyethylene glycol esters, vinyl resins such as copolymers of vinyl acetate and vinyl chloride, and cellulose esters such as cellulose acetate, cellulose triacetate, cellulose butyrate, and the like. Preferred plastic materials include polyester, in particular polyethylene terephthalate and vinyl chloride polymers, in particular a vinyl chloride/vinylacetate copolymer. Such plastic materials are readily available as clear, transpatent sheets or as pigmented opaque sheets, whichever may be required or desired for each particular component.

Frame member 14, support sheet 16 and back sheet component 18 may be conveniently prebonded together using, for example, a suitable adhesive. The internal facing surfaces of front sheet member 12 and frame 14 also may support layers of such an adhesive. After removal of interleaf 22 and insertion of an appropriate document 26, the front protective sheet may be bonded in superposition over the frame and the encased document using conventional heat sealing techniques.

The interleaf support member 22 may comprise any material of a hardness to offer sufficient support behind a magnetically encodable material. Although the interleaf 22 may be fitted loosely within the well opening 24, preferably, interleaf 22 is detachably connected in some manner to frame 14 or support member 16. Suitable means of attachment, for example, may include a perforated edge, spot adhesive, tear tabs, and the like. The interleaf must be of substantially the same dimensions as the well opening of the frame member. In a preferred embodiment, the interleaf member comprises the same material as frame member 14. A convenient method for preparing the interleaf and a method ensuring dimensional compatibility simply involves modifying the operation for preparing the frame member. Specifically, in preparing the frame member, the die used to cut out the well section can be modified so that three edges of the well are cut through while the remaining edge includes uncut tab sections. In this manner, the well cut-out remains in place, held through its tab connections, to avoid misalignment or loss during handling of the envelope structure. After serving its purpose as a preencoding support, the interleaf readily can be removed by lifting one of its free edges and tearing the member out along the incompletely cut edge. The envelope then is ready to accept an identification document.

The information-bearing identification document commonly is a photographic print. This photo may be prepared by any of the known photographic techniques and the method of preparation per se comprises no part of this invention. Since it is, of course, preferable that the photo system employed be such that the subject or bearer can be photographed and the card prepared and issued on the spot, the preferred system for preparing the photo utilizes principles in photography known as diffusion transfer to obtain either black-and-white or color photos, as the case may be. Most preferred are color images and these may be obtained, for example, in accordance with the procedures described in U.S. Pat. No. 2,983,606.

A particularly useful system for preparing the photo utilizes diffusion transfer photographic principles such as the color system described in the aforementioned U.S. patent to provide a photo of the bearer along with the descriptive information in the camera so that both the subject matter and the descriptive matter pertaining to the bearer are simultaneously photographed to provide a single developable image which is thereafter processed to provide a transfer print comprising a suitable support having thereon an image-bearing layer containing an image of the subject at one portion thereof and the descriptive matter at another portion thereof.

The procedure for preparing the photographic print may be accomplished most expeditiously using a POLAROID ID-3 Land Identification System equipped with a diffusion transfer color film unit available from Polaroid Corporation under the trademark designation POLACOLOR 2.

Magnetic stripe 20 may be applied to the outer surface of the protective sheet using any of a variety of known techniques. Typically, stripe 20 is provided for application in the form of a tape of about 2 mils thickness comprising ferric oxide dispersed in a matrix of a polyvinyl chloride polymer or copolymer. The tape may be applied with the aid of a solvent, an adhesive, or by hot stamping to produce magnetic stripe 20 firmly bonded to the protective sheet. While the figures depict the magnetic stripe supported by front protective sheet 12, the stripe also can be attached to the rear of the ID card on the outer surface of back sheet 18. In embodiments where a frontal stripe would overlie and obliterate information on the encased identification document, positioning on the back sheet member is preferred.

Certain modifications may be made in details of the above description of the invention without departing from the spirit and scope of the invention defined in the appended claims. Accordingly, it is intended that all matter contained in the above description or shown in the accompanying drawings be interpreted as illustrative and not limiting in nature.

What is claimed is:

1. An ID card structure comprising an envelope having front and back protective sheet components sandwiching a frame member having a well opening suitable to accommodate an information-bearing document therein, at least one of said front and back sheet components having a magnetic encoding capability provided by a layer of magnetic material in the form of a stripe extending over a predetermined area of the outermost surface of the sheet component, and including a removable interleaf member positioned within said well opening of the frame member, the dimensions of the interleaf member being substantially the same as the dimensions of the well opening so that when the interleaf is in position within the well opening of the frame and both front and back sheet components are superposed in sandwiching disposition thereto, substantially all portions of the magnetic stripe material are supported by a substantially flat surface provided by the frame and interleaf member, so that the magnetic stripe material may be encoded prior to insertion and sealing of an information-bearing document within the ID card structure.

2. The ID card structure of claim 1 wherein said interleaf member comprises the same material as the frame member.

3. The ID card structure of claim 2 wherein said interleaf member is connected to said frame member along a tearable edge.

4. The ID card structure of claim 1 including a support sheet set between the frame member and the back sheet component.

5. The ID card structure of claim 1 wherein the front and back sheet components and the frame member are made of plastic material.

6. The ID card structure of claim 5 wherein said plastic material is a vinyl chloride polymer or copolymer.

7. The ID card structure of claim 5 wherein said plastic material is a polyester.

8. The ID card structure of claim 1 wherein the magnetic stripe extends across the front protective sheet component.

9. The ID card structure of claim 1 wherein the magnetic stripe extends across the back protective sheet component.

10. A method of preparing a magnetically encoded ID card comprising:
   encoding a magnetic stripe element extending across a predetermined area of the outermost surface of a protective sheet component of an ID card structure;
   removing an interleaf member positioned within a well opening of an interior frame member of the ID card structure;
   inserting an information-bearing document into said well opening; and
   sealing said document encased within said well opening and sandwiched between two protective sheet members.

11. The method of claim 10 including marking said interleaf member with identifying indicia to ensure mating a magnetically encoded ID card structure with a corresponding information-bearing document.

* * * * *